US008484150B2

(12) United States Patent
Sparling et al.

(10) Patent No.: US 8,484,150 B2
(45) Date of Patent: Jul. 9, 2013

(54) SYSTEMS AND METHODS FOR ASSET CONDITION MONITORING IN ELECTRIC POWER SUBSTATION EQUIPMENT

(75) Inventors: Brian David Sparling, British Columbia (CA); Claude Beauchemin, Québec (CA); Jacques Aubin, Québec (CA)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 12/713,304

(22) Filed: Feb. 26, 2010

(65) Prior Publication Data

US 2011/0213744 A1    Sep. 1, 2011

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 3,821,605 A | 6/1974 | Pendrak | |
| 4,654,806 A | 3/1987 | Poyser et al. | |
| 5,396,172 A | 3/1995 | Lat et al. | |
| 6,233,137 B1 * | 5/2001 | Kolos et al. | 361/603 |
| 6,289,716 B1 | 9/2001 | Lindgren | |
| 6,906,630 B2 * | 6/2005 | Georges et al. | |
| 6,999,829 B2 | 2/2006 | Bazzocchi et al. | |
| 7,089,125 B2 | 8/2006 | Sonderegger | |
| 7,283,914 B2 | 10/2007 | Poorman et al. | |
| 7,289,857 B2 | 10/2007 | Nauck et al. | |
| 7,457,675 B2 | 11/2008 | Vesel | |
| 7,582,196 B2 * | 9/2009 | Babes-Dornea et al. | |
| 7,584,165 B2 | 9/2009 | Buchan | |
| 2003/0130755 A1 | 7/2003 | Bazzocchi et al. | |
| 2006/0259277 A1 | 11/2006 | Fantana et al. | |

(Continued)

FOREIGN PATENT DOCUMENTS

| | | |
|---|---|---|
| CN | 2735519 Y | 10/2005 |
| EP | 1609033 A1 | 12/2005 |

(Continued)

OTHER PUBLICATIONS

SRV: a virtual reality application to electrical substations operation training, Arroyo, E.; Arcos, J.L.L.; Multimedia Computing and Systems, 1999. IEEE International Conference on vol. 1 Digital Object Identifier: 10.1109/MMCS.1999.779309 Publication Year: 1999, pp. 835-839 vol. 1.*

(Continued)

*Primary Examiner* — Michael B Holmes
(74) *Attorney, Agent, or Firm* — Sutherland Asbill & Brennan LLP

(57) ABSTRACT

Certain embodiments of the invention may include systems and methods for asset condition monitoring in electrical power substation equipment. According to an example embodiment of the invention, a method is provided for detecting behavior in electrical substation equipment. The method may include receiving realtime data associated with a plurality of parameters associated with the substation equipment, storing at least a portion of the realtime data over a period of time, wherein the stored data comprises historical data, comparing the realtime and historical data, and generating a report based at least in part on a comparison of the realtime data and historical data.

20 Claims, 3 Drawing Sheets

U.S. PATENT DOCUMENTS

| | | |
|---|---|---|
| 2007/0052426 A1 | 3/2007 | Wells et al. |
| 2009/0009351 A1 | 1/2009 | Lamontagne |
| 2009/0134994 A1 | 5/2009 | Vesel |
| 2009/0138316 A1 | 5/2009 | Weller et al. |
| 2009/0204245 A1 | 8/2009 | Sustaeta et al. |

FOREIGN PATENT DOCUMENTS

| | | | |
|---|---|---|---|
| EP | 1788521 | A1 | 5/2007 |
| ES | 2253979 | A | 6/2006 |
| JP | 61112214 | A | 5/1986 |
| JP | 04064016 | A | 2/1992 |
| JP | 04237808 | A | 8/1992 |
| JP | 05281003 | A | 10/1993 |
| JP | 11-045101 | A | 2/1999 |
| JP | 11045101 | A | 2/1999 |
| JP | 2002083139 | A2 | 3/2002 |
| JP | 2006-522396 | A | 9/2006 |
| JP | 2006522396 | A | 9/2006 |
| WO | 03058527 | A2 | 7/2003 |
| WO | 2004074954 | A2 | 9/2004 |
| WO | 2004088443 | A1 | 10/2004 |
| WO | 2007022093 | A2 | 2/2007 |
| WO | 2007140627 | A1 | 12/2007 |
| WO | 2009046132 | A1 | 4/2009 |
| WO | 2009116059 | A2 | 9/2009 |
| WO | 2009117741 | A1 | 9/2009 |
| WO | 2009134832 | A2 | 11/2009 |

OTHER PUBLICATIONS

Qualitrol SmartSUB, Substation condition monitoring "Continuous, real time condition monitoring of All substation assets."*

Jahromi, Ali Naderian, et al., "An Approach to Power Transformer Asset Management Using Health Index," DEIS Feature Article, IEEE Electrical Insulation Magazine, 2009, pp. 20-34.

Office Action for Japanese Application No. 2011-036613.

Carl Kapes, "Transforming Data: Pepco is committed to on-line dissolved gas monitoring of all critical transformer assets." <www.tdworld.com>. Oct. 2011. pp. 58-63.

"Continuous, real time condition monitoring of All substation assets." SmartSUB: Substation condition monitoring <www.qualitrolcorp.com>. 4 pages.

"On-Line Monitoring of Power Transformers." Tree Tech. 7 pages.

"TransformerIQ: Intelligent Transformer Monitoring." <www.gridsense.com>. 6 pages.

"Fit at 50." ABB TrafoAsset Management. <www.abb.com/transformers>. pp. 63-69.

"TOA4 Online Product Information." Delta-X Research <www.deltaxresearch.com>. 2 pages.

* cited by examiner

SYSTEMS AND METHODS FOR ASSET CONDITION MONITORING IN ELECTRIC POWER SUBSTATION EQUIPMENT

FIELD OF THE INVENTION

This invention generally relates to electric power substation equipment, and more particularly, to systems and methods for asset condition monitoring in electrical power substation equipment.

BACKGROUND OF THE INVENTION

With the progressive aging of electrical power transmission equipment, growing awareness focuses on the reliability of the equipment. Decisions regarding associated substation equipment refurbishment or replacement, for example, may take into account the need to extract maximum return from operating costs and capital investments. Such decisions may rely on a dependable assessment of equipment. Several methods have been proposed for classifying the condition of certain power transmission components based on limited duration check-up type testing. However, the limited "snapshot" data acquired in such equipment tests may not provide a realistic evaluation of actual equipment conditions. A need remains for improved systems and methods for asset condition monitoring in electrical power substation equipment.

BRIEF SUMMARY OF THE INVENTION

Some or all of the above needs may be addressed by certain embodiments of the invention. Certain embodiments of the invention may include systems and methods for asset condition monitoring in electrical power substation equipment.

According to an example embodiment of the invention, a method for detecting behavior in electrical substation equipment is provided. The method may include receiving realtime data associated with a plurality of parameters associated with the substation equipment, storing at least a portion of the realtime data over a period of time, wherein the stored data comprises historical data, comparing the realtime and historical data, and generating a report based at least in part on a comparison of the realtime data and historical data.

According to another example embodiment, the method may further include receiving historical data associated with a plurality of parameters associated with the substation equipment.

According to another example embodiment, the method may include a comparison of realtime data and historical data, wherein the comparison of realtime data with historical data includes analyzing at least a portion of the data with a learned normal behavior model, wherein normal behavior is based at least in part on the historical data.

According to another example embodiment, a system may be provided for detecting behavior in electrical substation equipment. The system may include one or more transformers, a plurality of monitors operable to measure data associated with one or more transformers, and at least one processor. The at least one processor may be configured to: receive, from the plurality of monitors, realtime data associated with the one or more transformers, store at least a portion of the realtime data over a period of time, wherein the stored data comprises historical data, compare the realtime and historical data, and output a report based at least in part on a comparison of the realtime data and the historical data.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
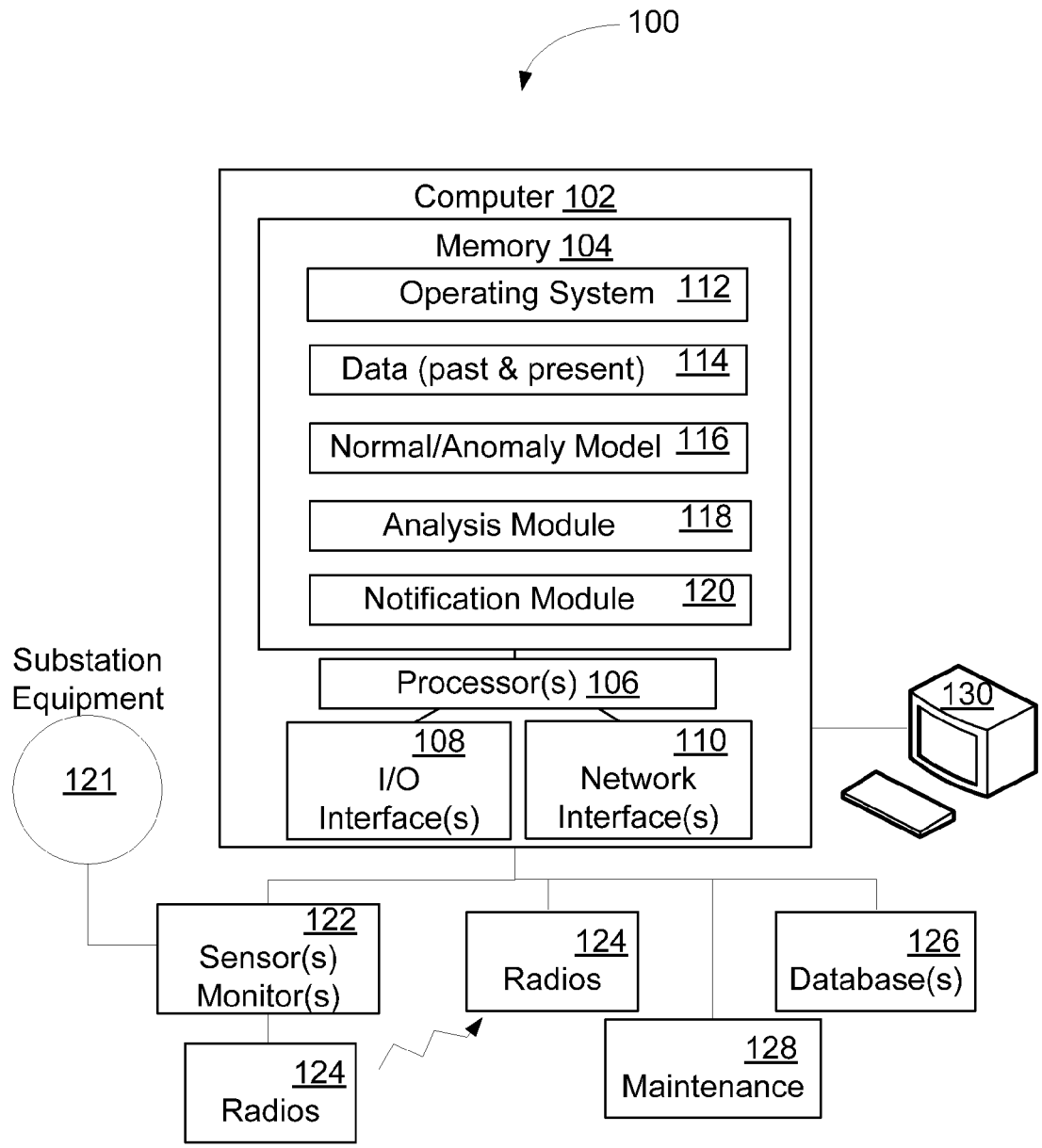
FIG. 1 is a block diagram of an illustrative system according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Electrical substations utilize many pieces of equipment in the conversion, control, and transmission of electrical power. The equipment may include power transformers, switches, tap changers, etc., along with sensors, monitors and associated control systems. Power transformers may be among the most expensive components in an electrical substation. Considering the continuous expansion of electrical networks, the aging of some equipment and the increasing demand for technical performance, many power utilities are facing the need to assess the actual technical condition of their transformers and related equipment. The condition assessment may provide economic and technical justifications for engineering decisions and capital replacement plans.

According to example embodiments of the invention, the assessment of the equipment condition may be made based on an analysis of historical data associated with the equipment, and on the latest available date associated with the equipment. In one example embodiment of the invention, the assessment may be made to produce a health index indicative of the condition of the equipment. In another example embodiment, the assessment may be utilized to detect and report anomalous behavior associated with the equipment so that corrective action may be taken.

According to example embodiments of the invention, realtime data associated with a plurality of parameters associated with substation equipment may include realtime data associated with one or more transformer components. In an example embodiment of the invention, several sources of data may be available as input for assessing the condition of the equipment. In certain embodiments, the data may be collected from periodic off-line tests. In other embodiments, the data may be continuous, for example, from on-line monitoring. The input data may be considered "realtime" even though it may be collected in batch form during periodic off-line testing. Therefore, the term "realtime" is defined to include the latest available or most recent data, regardless of the frequency at which the data is collected. In certain embodiments, realtime data may be accumulated and stored to make up at least a portion of the historical data associated with the equipment. In certain embodiments, the historical data may include manually entered data. For example, the historical data may include data gathered from the manufacturer, and the data may include test data taken at the factory, or it may include descriptive data, such a model, manufacture date, type of oil used, etc. In example embodiments, the historical data may include data associated with tests at the factory. In certain example embodiments, the historical data may include data associated with laboratory testing or field testing.

In example embodiments of the invention, the historical data may include data monitored over a predetermined duration. In one example embodiment, the predetermined duration may include the entire lifetime of the installed equipment. In another example embodiment, the predetermined duration may include a portion of lifetime of the installed equipment.

Example embodiments of the invention may be utilized to detect anomalous behavior associated with the equipment. In certain embodiments, a report may be generated when the anomalous behavior is detected. According to example embodiments, the report may include one or more of an alert, an alarm, or a message. In an example embodiment, the report may identify a probable cause of the anomalous behavior. In certain embodiments, the report may also provide a recommendation for corrective action.

In certain example embodiments of the invention, outputting a report may include generating an alert when behavior associated with one or more of the plurality of parameters changes. In certain example embodiments, the report may be generated based on a comparison of realtime and historical data, where the comparison of the realtime data and historical data may include analyzing a condition associated with the electrical substation equipment.

According to example embodiments, a condition associated with the electrical substation equipment may include behavior, a change in behavior, monitored data representative of the operation of the equipment, etc. In example embodiments of the invention, a report may include an identification of a probable cause of behavior or condition of the electrical substation equipment. In example embodiments of the invention, outputting the report may include generating a recommendation for corrective action when anomalous behavior has been detected. In certain example embodiments, a condition associated with the electrical substation equipment may be based at least in part on an analysis of data, including maintenance data, realtime data, batch-processed data, historical data, and/or any other available data or information associated with the electrical substation equipment.

In certain embodiments of the invention, a health index assessment of components associated with electrical substation equipment components may be made to provide information in deciding how to handle the overall equipment life management process. In certain embodiments, a population of components may be considered for determine a preliminary health index assessment. Such an assessment may be determined from test data and operating observations readily available. In certain embodiments, the preliminary health index assessment may be combined with a criticality index reflecting the strategic importance of the particular unit within the framework of the entire network. The resulting combined index may allow ranking of the units to identify those that need further testing and inspection in order to make an informed decision on the corrective action that should be implemented.

According to example embodiments of the invention, a method for assessing the equipment condition from test data available may include applying a weight to each of the test result to reflect the condition of the equipment. For example, the weight may represent the state of degradation of the equipment, and/or a probably associated with failure modes. In an example embodiment, a relative risk of failure may be assigned to each component associated with the equipment. In certain embodiments, failure statistics may be utilized to aid in determining the relative importance of each component. In an example embodiment of the invention, the equipment condition assessment may further comprise assigning a ranking scale to the test results. For example, test results of the components may be ranked on a scale from 1 to 4 (1 for very bad condition and 4 for excellent condition). In other embodiments, the ranking scale may include more or less numbers. In other embodiments, the ranking scale may be associated with other dimensions besides good and bad, for example, age, uncertainty, reliability of the result data, etc. In certain embodiments, the ranking factors can be based on recommended limits by any number of standards organizations or standards setting bodies. In other example embodiments, the ranking factors may be based on personal field experience.

According to certain example embodiments, the equipment condition assessment may provide an assessed failure risk, which may be similar to the inverse of the heath index. For example the IEEE Standard C57.140 (10) recommends a risk-based screening process to identify and prioritize transformers that represent the highest risk for the owner. In one example embodiment of the invention, an evaluation of component may be utilized to determine a failure risk. In another example embodiment, an evaluation of component may be utilized to determine a probability of a component failure degenerating into a more widespread failure that may include other components. In certain embodiments, the information provided may be in the form of test data. According to example embodiments of the invention, weighting may be assigned to the individual test information to compute an aggregate failure risk of, for example, a transformer, rather than failure risk of each subcomponent of the transformer.

In example embodiments of the invention, periodic "batch" tests may be complemented with on-line monitoring. In example embodiments, the health index may have provisions to include additional data as it become available. In example embodiments, the system may be capable of frequent updating to reflect the new conditions reported by on-line monitoring. In certain example embodiments, missing information or additional information may become available through new test or new monitoring without disturbing the health index score on a 0-100 scale. For example, if too many test results are missing, the heath index may still be calculated but a data quality index may be provided to show that the calculated value should be considered as only indicative and may require additional inputs to render the result credible.

Various sensors, monitors, data sources, and data evaluation modules may be utilized for assessing a condition associated with the electrical substation equipment. In example embodiments, the condition assessment may be based on behavior or a change in behavior associated with the equipment. Example embodiments of the invention will now be described with reference to the accompanying figures and flow diagrams.

FIG. 1 illustrates an example system 100 for detecting and responding to behavior in electrical substation equipment. According to example embodiments, the system may include a computer 102 having a memory 104 and at least one processor 106 operable to access the memory 104. According to example embodiments, the computer 102 may include one or more input/out interfaces 108. According to example embodiments, the computer 102 may include one or more network interfaces 110. In an example embodiment of the invention, the memory 104 may include one or more of: an operating system 112, a data module 114, an anomaly model 116, an analysis module 118, or a notification module 120. According to example embodiments of the invention, the operating system 112, anomaly model 116, analysis module 118, and/or notification module 120 may include computer-readable instructions for analyzing real-time and/or historical data, determining normal behavior, determining anomalies, and/or reporting results.

According to example embodiments of the invention, the one or more processors 106 may be in communication with monitors 122 via the input/output interfaces 108 or the network interfaces 110. The monitors 122 may be configured, operable, or programmed to sense, monitor, derive by computation, or acquire by any other suitable manner, continuously or periodically, automatically or manually measured parameters associated with substation equipment 121. According to example embodiments, the parameters may include dissolved gasses in oil associated with a transformer and/or an on load tap changer (OLTC). According to example embodiments, the parameters may include, but are not limited to, one or more of load currents, oil temperatures, ambient temperature, winding hottest spot temperature, moisture in oil, moisture in the winding paper solid insulation, moisture in the barriers solid insulation, oil quality, dielectric strength, acidity, color, interfacial tension, dissipation factor of the oil, inhibitor content of the oil, furanic compound content in the oil, partial discharge activity, dissolved metals in oil, particle count in the oil, dissipation factor and capacitance measurements of the active part of the transformer, dissipation factor measurements and capacitance measurements of the bushings, interpretations of infrared images, frequency response analysis, recovery voltage measurements, or impedance measurements. The parameters may comprise information obtained from continuous monitoring of the OLTC, including the number of operations, motor torque index, OLTC temperature differential index, number of days since the last operation of a reversing switch, dissolved gases in oil of the OLTC compartments, and/or status and efficiency of the cooling system. According to example embodiments of the invention, the monitors 122 could acquire some or all the data used by the invention.

According to an example embodiment of the invention, the parameters may be monitored, saved, processed, and/or analyzed, at least in part, by one or more of the modules (112, 114, 116, 118, 120) associated with the computer 102. In certain example embodiments the parameters may be monitored, saved, processed, and/or analyzed, at least in part, by one or more of the sensors and/or monitors modules 122. In certain example embodiments, one or more radios 124 may be utilized to transmit measured parameter data from one or more monitors 122 to the computer 102.

In example embodiments of the invention, one or more databases 126 may be in communication with the one or more processors 106 via one or more input/output interfaces 108 or via one or more network interfaces 110. The database 126 may be utilized to store data associated with the substation equipment 121, the data may include realtime and/or historical data. In certain example embodiments, the database 126 may be utilized to store data related with the substation equipment 121. The data may be real time and/or historical. According to example embodiments, the data may be collected from the monitors 122. According to example embodiments, the data associated with the substation equipment 121 may include other data or information that may or may not be analyzed or processed. In certain example embodiments, the one or more processors 106 may be in communication with a maintenance database 128 or with any number of databases containing real time or historical data.

In certain example embodiments, the system 100 may also include one or more terminals 130 for receiving reports, alerts, etc. In certain example embodiments, the one or more terminals 130 may be utilized for inputting data into the system 100. In certain embodiments, the data may be entered into the system 100 manually via the one or more terminals 130. In other embodiments, the data may be entered into the system 100 automatically or by means of batch data, or by data transfers from the databases 126, 128.

In certain example embodiments of the invention, the notification module 120 may provide one or more notifications, alerts, reports, etc. based at least in part on an analysis of the data 114 via the analysis module 118 or the anomaly model 116. The one or more notifications, alerts, reports, etc., may be sent to the one or more terminals 130, and/or to any notification medium that may be in communication with the system 100, including via e-mail, SMS messaging, cell phone message, internet packet, etc.

Figure 2:
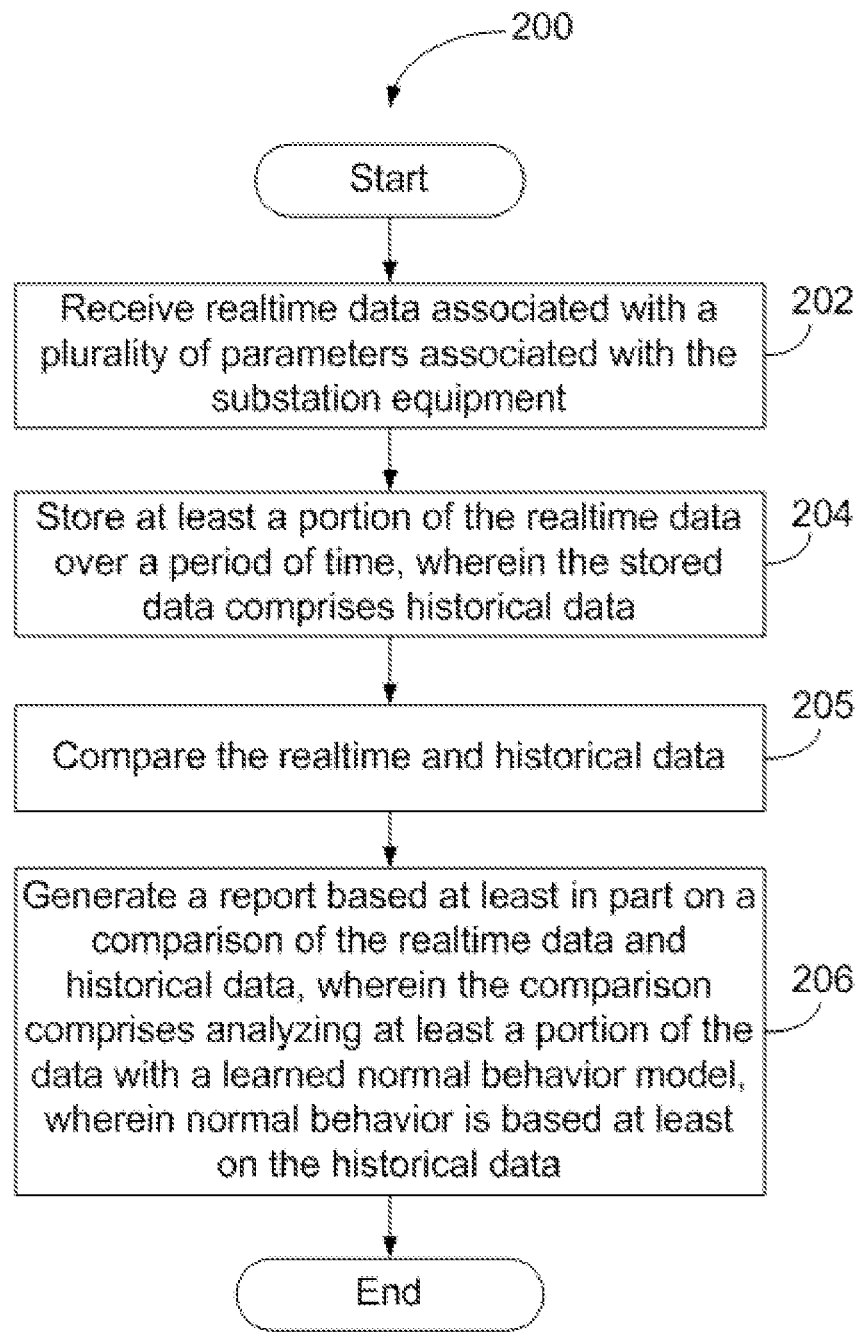
FIG. 2 is a flow diagram of an example method according to an example embodiment of the invention.

FIG. 2 depicts an example method 200 flow diagram for detecting behavior in electrical substation equipment, according to an example embodiment of the invention. In block 202 realtime data associated with a plurality of parameters associated with the substation equipment 121 may be received. In block 204, at least a portion of the realtime date is stored over a period of time, wherein the stored data comprises historical data. In block 205, the realtime and historical data is compared. In block 206, a report is generated based at least in part on a comparison of the realtime data and historical data, wherein the comparison comprises analyzing at least a portion of the data with a learned normal behavior model, wherein normal behavior is based at least on the historical data. The method 200 ends after block 206.

Figure 3:
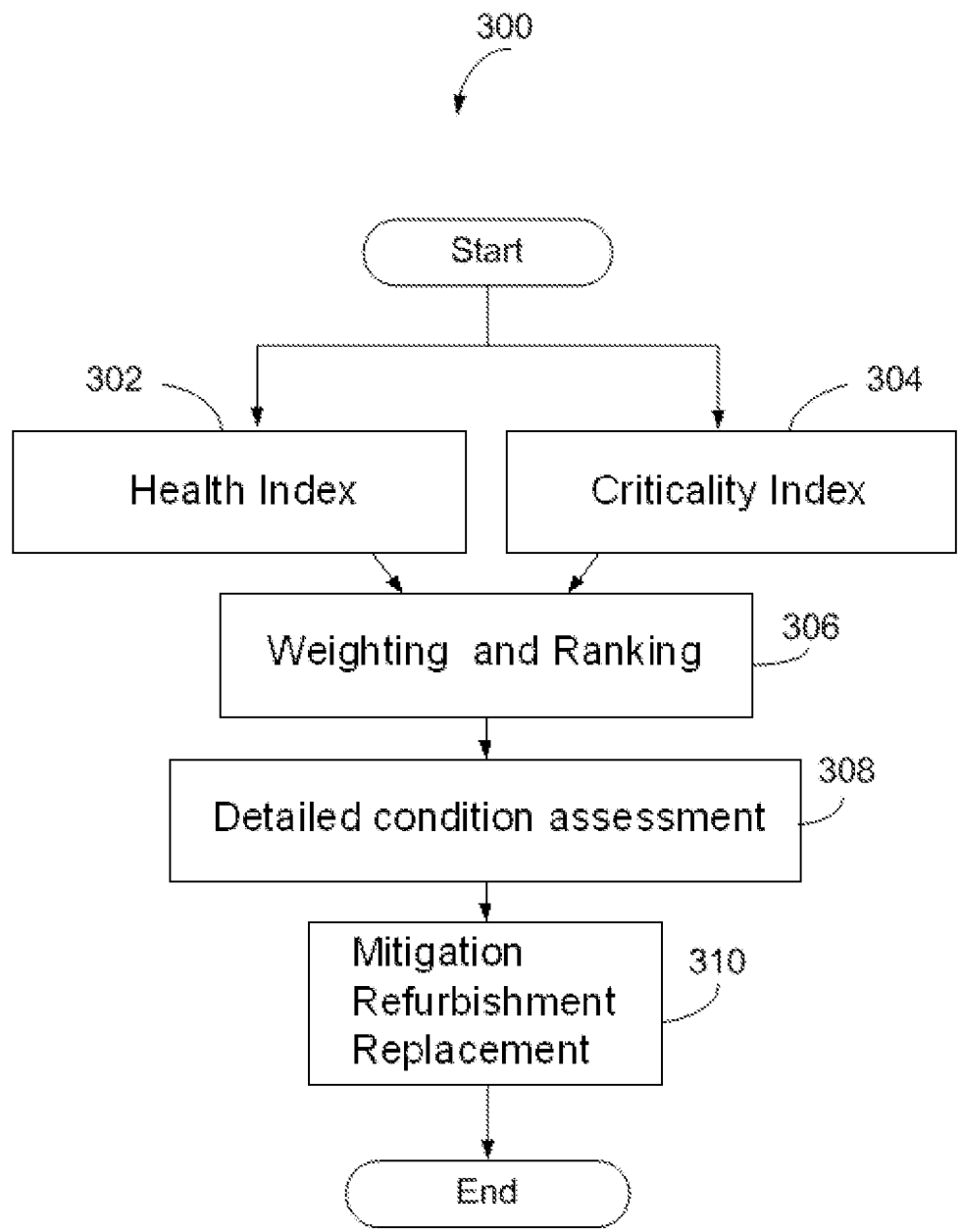
FIG. 3 is another flow diagram of an example method according to an example embodiment of the invention.

An example method 300 for assessing and responding to detected behavior associated with substation equipment 121 will now be described with reference to the flowchart of FIG. 3. In block 302, a heath index is determined. According to example embodiments of the invention, the health index may include a number or value representative of the substation equipment current condition. In certain embodiments, the health index may allow a classification of equipment (including transformers) for determining capital spending priorities. In certain embodiments, the health index may be a preliminary health assessment based on available data, and it can be further developed if the condition of the unit warrants further testing and detailed inspection. In block 304 and according to an example embodiment of the invention, a criticality index may be determined. According to example embodiments, the criticality index may include a relative importance of each component of the substation equipment with respect to a risk of failure. In block 306 the health index and the criticality index may be weighted and ranked according to component degradation and failure modes that may reflect reality, or may be based on statistical models, or may be based on personal experience. In block 308, a detailed condition assessment may be performed based on the information provided in the previous blocks. In block 310, a recommendation for corrective action may be provided that may included mitigation, refurbishment, or replacement of one of more of the substation components. The method 300 ends after block 310.

According to example embodiments of the invention, a health index report may be generated upon receipt of new data from either continuous monitoring systems, or periodic testing, where each parameter of an associated component or aggregation of components of the equipment may have an associated score and weighting. According to example embodiments of the invention, analysis of each major component of the equipment may include a weighting, where each major component has associated parameters with an established scoring number based on levels and/or rates of change of the parameter measured and/or computed. According to example embodiments of the invention, a report may be determined and presented in a standardized format, where the overall health of the equipment may be presented based on the weighting and determined score of each major component. According to example embodiments of the invention, the report may accumulate the scores for each equipment grouping, and present a view of a combined number of similar equipment items to judge the number of healthy versus, not so healthy units and units in poor health. In accordance with certain embodiments of the invention, the report may include a view can be presented in graphical form. In accordance with certain embodiments of the invention, the report may include a view can be presented in combined numerical and graphical form According to example embodiments of the invention, the report may also contain a criticality index. In certain embodiments, the critically index may be a computed value taking into account one or more of the energy not served if the unit were out of service, the assessment as to the number and location of spare units, the relative ease of access for repairs, the obsolescence of equipment and/or its components, an assessment of the physical location of the equipment with respect to the public at large, assessment of the ease of access for replacement of the unit, assessment of the cost of repair or replacement, assessment of the lead time of repair or replacement, and an assessment on the impact to the environment with respect to the type of fluid used or a location relative to sensitive environment areas. According to example embodiments of the invention, the report may include a risk index, where the risk index may be a computed result of the health index score of an individual unit and its associated criticality index.

Accordingly, example embodiments of the invention can provide the technical effects of creating certain systems and methods that provide a ranking of electrical substation equipment and related components for identifying those components that need further testing and inspection in order to take an informed decision on the corrective action that should be implemented. Example embodiments of the invention can provide the further technical effects of providing systems and methods for informing equipment owners of the equipment health and operating condition so that they may plan their repair or refurbishment or replacement or operating limits in an orderly fashion. Example embodiments of the invention can provide the further technical effects of providing systems and methods for detecting anomalies in behavior. Example embodiments of the invention can provide the further technical effects of extending life of the equipment.

In example embodiments of the invention, the system 100 may include any number of software applications that are executed to facilitate any of the operations.

In example embodiments, one or more input/output (I/O) interfaces may facilitate communication between the system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the system 100 with more or less of the components illustrated in FIG. 1.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto one of more of a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, The claimed invention is:

1. A method for detecting behavior in electrical substation equipment comprising:
   receiving realtime data associated with a plurality of parameters associated with the substation equipment;
   storing at least a portion of the realtime data over a period of time, wherein the stored data comprises historical data;
   comparing the realtime and historical data; and
   generating a report based at least in part on a comparison of the realtime data and historical data, the report comprising a recommendation for corrective action.

2. The method of claim 1, wherein receiving realtime data associated with a plurality of parameters associated with the substation equipment comprises receiving realtime data associated with one or more of transformers, transformer components, switches, bushings, or tap changers.

3. The method of claim 1, wherein monitoring a plurality of parameters comprises monitoring the electrical substation equipment over a predefined duration.

4. The method of claim 1, wherein the plurality of parameters comprise one or more of: dissolved gasses in oil, oil quality, dielectric strength, acidity, color, interfacial tension, oil dissipation factor, oil inhibitor content, oil furanic compound content, partial discharge activity, dissolved metals in oil, particle count in oil, dissipation factor, capacitance, infrared images frequency response, recovery voltage, impedance, motor torque index, temperature differential index, number of days since the last operation of the reversing switch, or cooling system status.

5. The method of claim 1, wherein generating the report comprises generating an alert when the behavior associated with one or more of the plurality of parameters changes.

6. The method of claim 1, wherein comparison of the realtime data and historical data comprises analyzing a condition associated with the electrical substation equipment.

7. The method of claim 1, wherein generating the report comprises identifying a probable cause of behavior.

8. The method of claim 1, wherein generating the report comprises determining the recommendation for corrective action.

9. The method of claim 1, wherein the method further comprises analyzing maintenance data associated with the electrical substation equipment.

10. A system comprising:
    one or more transformers;
    a plurality of monitors operable to measure data associated with the one or more transformers; and
    at least one processor configured to:
      receive, from the plurality of monitors, realtime data associated with the one or more transformers;
      store at least a portion of the realtime data over a period of time, wherein the stored data comprises historical data;
      compare the realtime and historical data; and
      generate one or more reports based at least in part on a comparison of the realtime data and the historical data, wherein at least one of the one or more reports comprises a recommendation for corrective action.

11. The system of claim 10, wherein the at least one processor is further configured to monitor a plurality of parameters associated with the one or more of transformers, transformer components, switches, bushings, or tap changers over a predefined duration.

12. The system of claim 10, the realtime data comprising one or more parameters of: dissolved gasses in oil, oil quality, dielectric strength, acidity, color, interfacial tension, oil dissipation factor, oil inhibitor content, oil furanic compound content, partial discharge activity, dissolved metals in oil, particle count in oil, dissipation factor, capacitance, infrared images frequency response, recovery voltage, impedance, motor torque index, temperature differential index, number of days since the last operation of the reversing switch, or cooling system status.

13. The system of claim 10, wherein comparison of the realtime data and historical data comprises analyzing a condition associated with the one or more transformers.

14. The system of claim 10, wherein comparison of realtime data with historical data comprises analyzing at least a portion of the data with a learned normal behavior model, wherein normal behavior is based at least in part on the historical data.

15. The system of claim 10, wherein comparison of realtime data with historical data comprises analyzing at least a portion of the data with a learned normal behavior model, wherein normal behavior is based at least in part on the historical data, and wherein the model is agnostic with respect to one or more parameters associated with the data.

16. The system of claim 10, wherein the one or more processors are further configured to analyze maintenance data associated with the one or more transformers.

17. A system comprising:
    one or more transformer components;
    a plurality of monitors configured to measure data associated with the one or more transformer components; and
    at least one processor configured to:
      receive, from the plurality of monitors, realtime data associated with the one or more transformer components;
      store at least a portion of the realtime data over a period of time, wherein the stored data comprises historical data;
      compare the realtime and historical data; and
      generate output based at least in part on a comparison of the realtime data and the historical data, the output comprising a recommendation for corrective action.

18. The system of claim 17, the one or more transformer components comprising one or more switches, bushings, or tap changers.

19. The system of claim 17, the output comprising a report.

20. The system of claim 17, the realtime data comprising one or more parameters of: dissolved gasses in oil, oil quality, dielectric strength, acidity, color, interfacial tension, oil dissipation factor, oil inhibitor content, oil furanic compound content, partial discharge activity, dissolved metals in oil, particle count in oil, dissipation factor, capacitance, infrared images frequency response, recovery voltage, impedance, motor torque index, temperature differential index, number of days since the last operation of the reversing switch, or cooling system status.

* * * * *